United States Patent
Lee et al.

(10) Patent No.: US 11,393,465 B2
(45) Date of Patent: Jul. 19, 2022

(54) ARTIFICIAL INTELLIGENCE APPARATUS FOR SPEECH INTERACTION AND METHOD FOR THE SAME

(71) Applicant: LG ELECTRONICS INC., Seoul (KR)

(72) Inventors: Wonyoung Lee, Seoul (KR); Sihyuk Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 324 days.

(21) Appl. No.: 16/488,126

(22) PCT Filed: Apr. 17, 2019

(86) PCT No.: PCT/KR2019/004648
§ 371 (c)(1),
(2) Date: Aug. 22, 2019

(87) PCT Pub. No.: WO2020/213758
PCT Pub. Date: Oct. 22, 2020

(65) Prior Publication Data
US 2021/0366472 A1    Nov. 25, 2021

(51) Int. Cl.
*G10L 15/00* (2013.01)
*G10L 15/22* (2006.01)
(Continued)

(52) U.S. Cl.
CPC .............. *G10L 15/22* (2013.01); *G06F 40/30* (2020.01); *G06N 20/00* (2019.01);
(Continued)

(58) Field of Classification Search
None
See application file for complete search history.

(56) References Cited

U.S. PATENT DOCUMENTS

2008/0141285 A1    6/2008  Lee et al.
2016/0379121 A1*  12/2016  Ge .......................... G10L 15/22
                                                            706/46
(Continued)

FOREIGN PATENT DOCUMENTS

KR    1020080053132    6/2008
KR    1020120072445    7/2012
(Continued)

OTHER PUBLICATIONS

Korean Intellectual Property Office Application Serial No. 10-2019-7020885, Office Action dated Feb. 15, 2021, 7 pages.
PCT International Application No. PCT/KR2019/004648, Written Opinion of the International Searching Authority dated Jan. 16, 2020, 9 pages.

*Primary Examiner* — Satwant K Singh
(74) *Attorney, Agent, or Firm* — Lee Hong Degerman Kang & Waimey

(57) ABSTRACT

An artificial intelligence apparatus for a speech interaction comprises: a microphone configured to obtain speech data corresponding to an utterance sentence of a user; a memory configured to store a first platform framework corresponding to a default platform of the artificial intelligence apparatus and at least one second platform framework; a communication unit configured to communicate with at least one of an Internet of Things (IoT) device or an external platform apparatus; and a processor configured to: obtain intention information corresponding to the speech data, determine at least one target device among the artificial intelligence apparatus, the IoT device, or the external platform apparatus based on the intention information, determine a target platform framework among the first platform framework or the second platform framework based on the intention information, generate a command corresponding to the speech data using the determined target platform framework, and per- (Continued)

form an operation corresponding to the speech data for the target device using the generated command.

12 Claims, 12 Drawing Sheets

(51) Int. Cl.
  *G06N 20/00* (2019.01)
  *G06F 40/30* (2020.01)
  *G10L 15/18* (2013.01)
  *G10L 15/30* (2013.01)
  *G10L 15/16* (2006.01)
(52) U.S. Cl.
  CPC .......... *G10L 15/1815* (2013.01); *G10L 15/30* (2013.01); *G10L 15/16* (2013.01); *G10L 2015/223* (2013.01)

(56) References Cited

U.S. PATENT DOCUMENTS

| | | | |
|---|---|---|---|
| 2017/0367132 A1 | 12/2017 | Sinha | |
| 2018/0301147 A1* | 10/2018 | Kim | G10L 15/08 |
| 2018/0322870 A1* | 11/2018 | Lee | H04N 21/4394 |
| 2019/0140856 A1* | 5/2019 | Choi | G05B 19/042 |
| 2020/0090654 A1 | 3/2020 | Shin et al. | |

FOREIGN PATENT DOCUMENTS

| | | |
|---|---|---|
| KR | 101471362 | 12/2014 |
| KR | 20180115628 | 10/2018 |
| KR | 1020180126946 | 11/2018 |
| WO | 2016203455 | 12/2016 |

* cited by examiner

| DEVICE | NAME | IDENTIFICATION INFORMATION | TYPE | PLATFORM FRAMEWORK | CONNECTION RELATIONSHIP |
|---|---|---|---|---|---|
| DEVICE 1 | DeepThinkQ™ Speaker | Hub-0 | PLATFORM HUB | DeepThinkQ™ | ITSELF |
| DEVICE 2 | Alexa™ Speaker | Hub-1 | PLATFORM HUB | Alexa™ | Hub-0 |
| DEVICE 3 | Light | IoT-1 | IoT DEVICE | DeepThinkQ™ | Hub-0 |
| DEVICE 4 | Air Cleaner | IoT-2 | IoT DEVICE | Alexa™ | Hub-0, Hub-1 |
| DEVICE 5 | Air Conditioner | IoT-3 | IoT DEVICE | Alexa™ | Hub-1 |

```
{
        PlatformName: "Alexa",
        Command: {
                Language: "English",
                InputType: "Text"
        },
        ...
}
```

```
{
        UserID:"user001",
        Language:"Korean",
        TargetPlatform: ["Alexa", "Clova"]
        ProductsInformation: {
                        "Alexa" :["AirPurifier", "HueLight"],
                        "Clova":["AirConditioner"]

```
{
    TargetPlatform: " Alexa ",
    Final: " Yes ",
    Result: " Operating Air Cleaner. ",
    ResultDetails: " Air Volume 3, Rotation Mode "
}
```

ARTIFICIAL INTELLIGENCE APPARATUS FOR SPEECH INTERACTION AND METHOD FOR THE SAME

CROSS-REFERENCE TO RELATED APPLICATIONS

This application is the National Stage filing under 35 U.S.C. 371 of International Application No. PCT/KR2019/004648, filed on Apr. 17, 2019, the contents of which are hereby incorporated by reference herein in its entirety.

TECHNICAL FIELD

The present invention relates to an artificial intelligence apparatus for a speech interaction and a method for the same. Specifically, the present invention relates to an artificial intelligence apparatus for a speech interaction with platform apparatuses or Internet of Things (IoT) devices operating in various platforms, and a method for the same.

BACKGROUND ART

Artificial intelligence is one field of computer engineering and information technology for studying a method of enabling a computer to perform thinking, learning, and self-development that can be performed by human intelligence and may denote that a computer imitates an intelligent action of a human.

Artificial intelligence is directly or indirectly associated with the other field of computer engineering without being individually provided. Particularly, in various fields of information technology, an attempt to introduce artificial intelligence components and use the artificial intelligence components in solving a problem of a corresponding field is being actively done.

These artificial intelligence services are classified by service type such as speech/text based interactive services, deep learning based image recognition, speech recognition/conversion services, and machine learning/deep learning platform services.

For example, various artificial intelligence platforms, such as LG's DeepThinkQ, Google's AlphaGo or Deep Q-Network, Amazon's Alexa, Naver's Clova, KT's Giga Genie, SKT's NUGU, Apple's Siri, Facebook's DeepText, and IBM's Watson, are being developed or serviced However, as various artificial intelligence platforms are serviced, a plurality of artificial intelligence platform apparatus are mixed in one household, and each device can be controlled according to the supported artificial intelligence platform, thus causing user inconvenience.

PRIOR ART DOCUMENT

Patent Document (Patent Document 1) Korean Patent Application Publication No. 10-2018-0134099

DISCLOSURE OF THE INVENTION

Technical Problem

The present invention is directed to provide an artificial intelligence apparatus for integrating and controlling devices based on various artificial intelligence platforms during speech interaction, and a method for the same.

In addition, the present invention is directed to provide an artificial intelligence apparatus capable of performing interaction by determining a necessary artificial intelligence platform framework even if a user utters speech while specifying only an IoT device so as to control the IoT device.

Technical Solution

One embodiment of the present invention provides an artificial intelligence apparatus and a method for the same, wherein the artificial intelligence apparatus obtains speech data corresponding to an utterance sentence of a user, obtains intention information corresponding to the obtained speech data, determines a target device based on the obtained intention information, determines a target platform framework among a plurality of platform framework based on the obtained intention information, generates a command corresponding to the speech data using the determined target platform framework, and performs an operation on the target device using the generated command, and a method for the same.

In addition, one embodiment of the present invention provides an artificial intelligence apparatus and a method for the same, wherein the artificial intelligence apparatus stores a connection table including information about artificial intelligence platform apparatuses and IoT devices interworking therewith, determines an artificial intelligence platform framework necessary for interaction with the IoT device using the connection table even if the speech data specifies only the IoT device, generates a command corresponding to the speech data using the determined artificial intelligence platform framework, and performs an interaction on the IoT device using the generated command.

Advantageous Effects

According to various embodiments of the present invention, since it is possible to perform a speech interaction with devices operating on various artificial intelligence platforms by using only one artificial intelligence apparatus, it is possible to easily interact with various artificial intelligence apparatuses or IoT devices.

In addition, according to various embodiments of the present invention, even if the artificial intelligence platform is not specified, the interaction may be performed by using the artificial intelligence platform framework suitable for the artificial intelligence platform apparatus or the IoT device to be interacted with.

Furthermore, according to various embodiments of the present invention, it is possible to perform a speech interaction with an IoT device without an artificial intelligence speech agent.

BRIEF DESCRIPTION OF THE DRAWINGS

FIG. 5 is a view illustrating an example of a connection table according to an embodiment of the present invention.

FIG. 10 is a view illustrating an example of a command format 1001 of a platform framework according to an embodiment of the present invention.

FIG. 11 is a view illustrating an example of user information 1101 according to an embodiment of the present invention.

FIG. 12 is a view illustrating an example of a response 1201 for a speech interaction according to an embodiment of the present invention.

MODE FOR CARRYING OUT THE INVENTION

Figure 1:
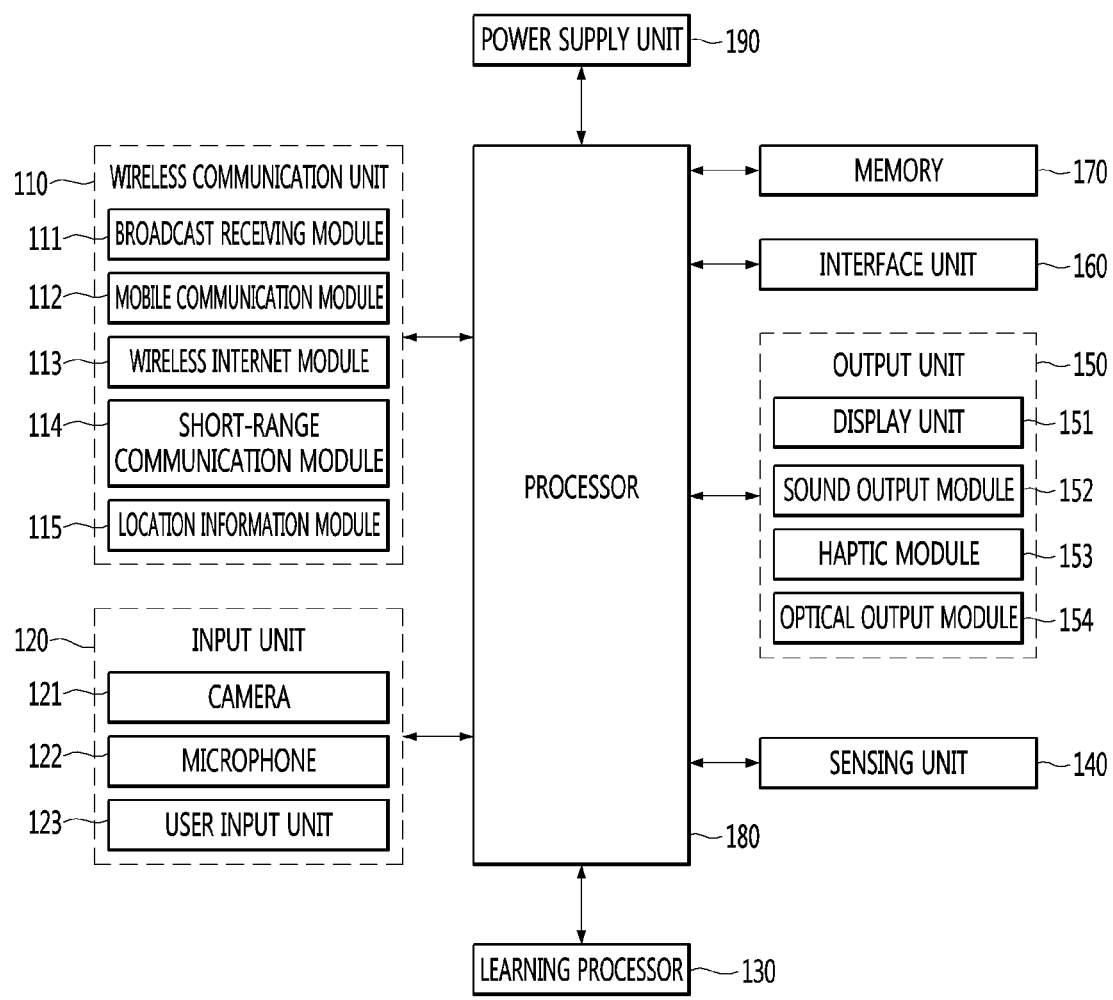
FIG. 1 is a block diagram illustrating a configuration of a terminal according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks are configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be learned by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN learned based on training data may classify or cluster input data, based on a pattern of the input data.

In this specification, an ANN learned based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be learned in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be learned by receiving and using data which does not deceive the discriminator, and the discriminator may be learned by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of the terminal 100 according to an embodiment of the present invention.

Hereinafter, the terminal 100 may be called an artificial intelligence (AI) apparatus 100.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data.

The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
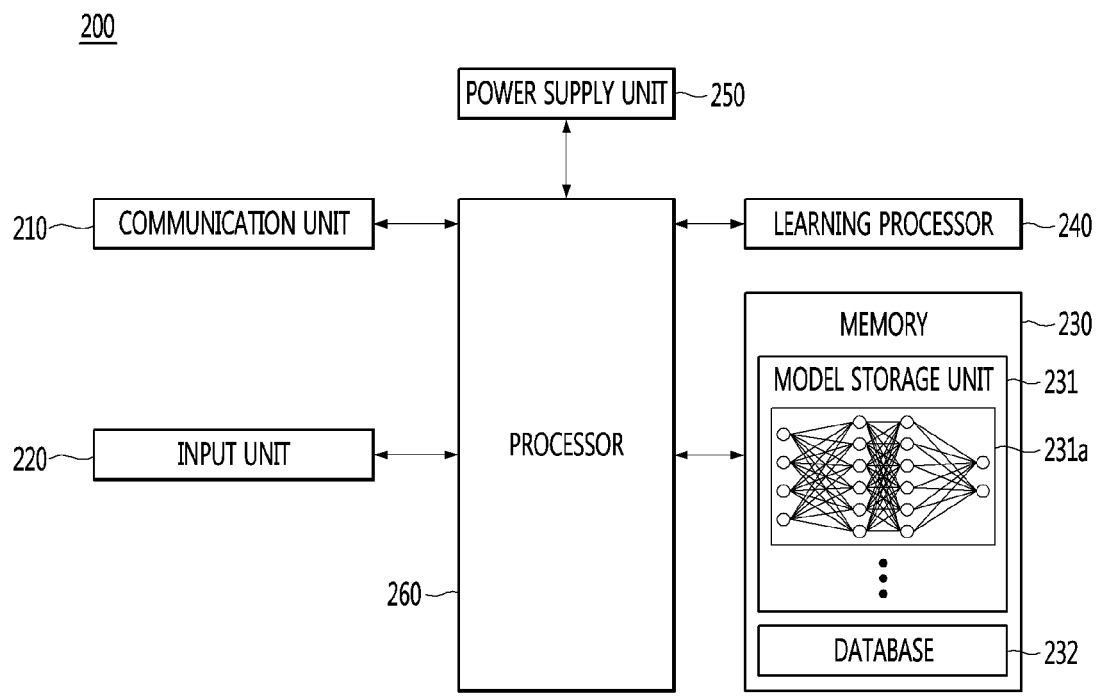
FIG. 2 is a block diagram illustrating a configuration of a learning device of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
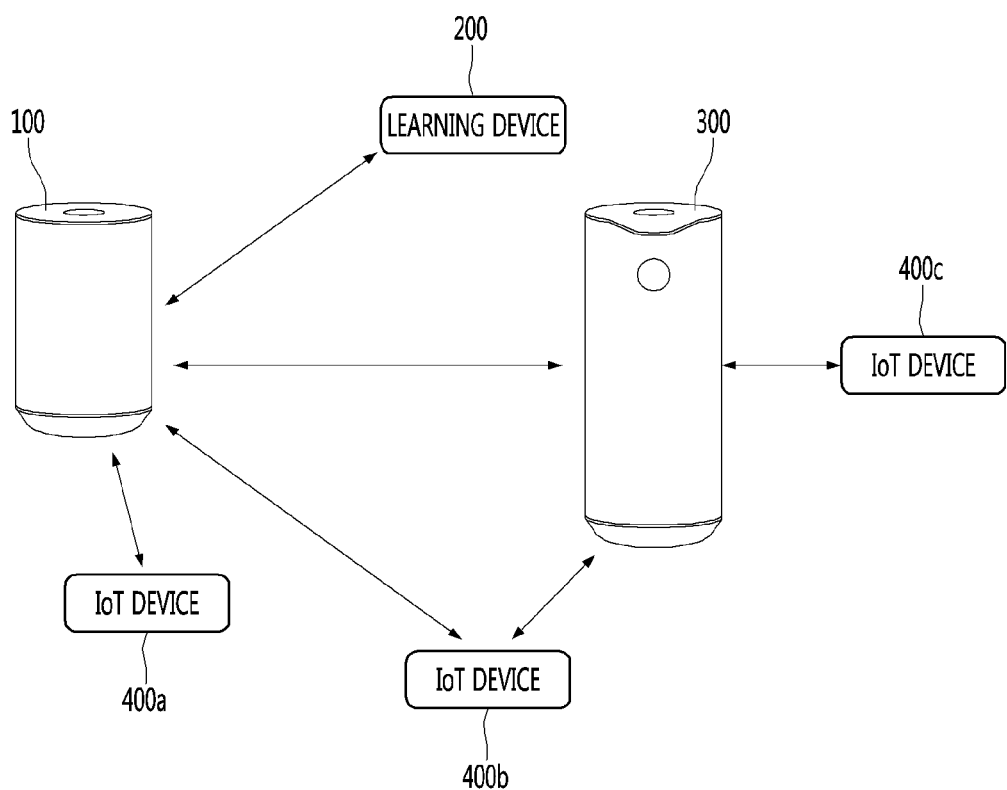
FIG. 3 is a view illustrating an artificial intelligence system 1 according to an embodiment of the present invention.

FIG. 3 is a view illustrating an AI system 1 according to an embodiment of the present invention.

Referring to FIG. 3, the AI system 1 according to the embodiment of the present invention may include an AI apparatus 100, a learning device 200, an external platform apparatus 300, and an IoT device 400a, 400b, or 400c.

The AI system 1 according to the embodiment of the present invention essentially includes an AI apparatus 100 and at least one IoT device 400a, 400b, or 400c, and may selectively include the learning device 200 and the external platform apparatus 300.

The AI apparatus 100 and the external platform apparatus 300 are equipped with respective default platforms. Each platform may operate through the platform framework.

The AI apparatus 100 may store not only its own platform framework but also at least one other platform framework in the memory 170.

Each platform framework may include a software development kit (SDK) corresponding to each platform.

The software development kit is a collection of tools used to develop software, and may include a development tool program, a debugging program, a document application programming interface (API), and the like.

Each platform framework may refer to a collection of software libraries that provide API corresponding to each platform.

The platform refers to AI platform, and may refer to an ecosystem of AI technologies used when the AI apparatus 100 or the external platform apparatus 300 according to the embodiment of the present invention interacts with the user to provide various functions or controls the IoT device 400a, 400b, or 400c.

For example, the AI platform includes LG's ThinkQ™ or DeepThinkQ™, Amazon's Alexa™, and Google's Google Assistant™.

The AI apparatus 100 or the external platform apparatus 300 according to the embodiment of the present invention may serve as an interface between the user and the AI platform.

Hereinafter, the default platform of the AI apparatus 100 may be referred to as a first platform, and the platform framework used by the first platform may be referred to as a first platform framework. A platform different from the first platform may be referred to as a second platform, and a platform framework different from the first platform framework may be referred to as a second platform framework.

The IoT device 400a, 400b, or 400c may be classified into three types according to type.

The first type IoT device 400a may refer to an IoT device using the first platform framework.

The second type IoT device 400b may refer to an IoT device that uses the second platform framework, does not use the first platform framework, and can perform interworking or control by using the second platform framework mounted on the AI apparatus 100.

The third type IoT device 400c may refer to an IoT device that uses the second platform framework, does not use the first platform framework, cannot perform interworking or control even if the second platform framework mounted on the AI apparatus 100 is used, and can perform interworking or control when the second platform framework mounted on the external platform apparatus 300 is used.

That is, the first type IoT device 400a may refer to a device that uses the first platform framework to interwork with the default platform of the AI apparatus 100, and the second type IoT device 400b and the third type IoT device 400c may refer to a device that uses the second platform framework different from the first platform framework.

The first type IoT device 400a and the second type IoT device 400b may refer to a device that can be directly interworked and controlled by the AI apparatus 100, and the third type IoT apparatus 400c may refer to a device that can be directly interworked or controlled by the AI apparatus 100.

The AI apparatus 100 may be used to control the first type IoT device 400a that can interwork with the first platform. That is, the AI apparatus 100 may directly control the first type IoT device 400a using the first platform framework, which is the default platform framework.

The AI apparatus 100 may be used to control the second type IoT device 400b by using the second platform framework mounted thereon. That is, the AI apparatus 100 may directly control the second type IoT device 400b by using the second platform framework mounted thereon.

For example, it may be assumed that the default platform (first platform) of the AI apparatus 100 according to the embodiment of the present invention is DeepThinkQ™, and a target air cleaner to be controlled supports only Alexa™, which is another platform. In this case, the AI apparatus 100 may generate a command that the target air cleaner supports an utterance sentence input by using a framework for Alexa™ mounted therein, and control the target air cleaner by transmitting the generated command to the target air cleaner.

The AI apparatus 100 may be used to control the second type IoT device 400b using a language that is not supported by the second platform framework. That is, the AI apparatus 100 may obtain the utterance sentence of the language that is not supported by the second platform framework, and may control the second type IoT device 400b by converting the utterance sentence into a language or a command supported by the second platform framework.

For example, it may be assumed that the default platform (first platform) of the AI apparatus 100 according to the embodiment of the present invention is DeepThinkQ™, the target air cleaner to be controlled supports only Alexa™, which is another platform, and Alexa™ supports only English. In this case, the AI apparatus 100 may convert the utterance sentence of the language (e.g., Korean) other than English into English or a control command, may generate a command supported by the target air cleaner from the English utterance sentence or the control command using the framework for Alexa™ mounted thereon, and may control the target air cleaner by transmitting the generated command to the target air cleaner.

The AI apparatus 100 may be used to control the third type IoT device 400c that cannot be directly interworked. That is, the AI apparatus 100 may control the third type IoT device 400c through the external platform apparatus 300.

For example, it may be assumed that the default platform (first platform) of the AI apparatus 100 according to the embodiment of the present invention is DeepThinkQ™, the target air cleaner to be controlled supports only Alexa™, which is another platform, and the target air cleaner can be controlled only through the external platform apparatus 300. In this case, the AI apparatus 100 may control the target air cleaner by transmitting the utterance sentence or the control command generated from the utterance sentence to the external platform apparatus 300.

The AI apparatus 100 may be used to control the external platform apparatus 300 or the third type IoT device 400c using the language that is not supported by the external platform apparatus 300. That is, the AI apparatus 100 may control the external platform apparatus 300 or the third type IoT device 400c by receiving the utterance sentence in the language that is not supported by the external platform apparatus 300, converting the received utterance sentence into a language or a command supported by the external platform apparatus 300, and then transmitting the converted utterance sentence.

For example, it may be assumed that the default platform (first platform) of the AI apparatus 100 according to the embodiment of the present invention is DeepThinkQ™, the target air cleaner to be controlled supports only Alexa™, which is another platform, Alexa™ supports only English, and the target air cleaner can be controlled only through the external platform apparatus 300. In this case, the AI apparatus 100 may control the target air cleaner by converting the utterance sentence of the language (e.g., Korean) other than English into English or a control command and transmitting the English utterance sentence or the control command to the external platform apparatus 300.

The AI apparatus 100 may be used to control the external platform apparatus 300. That is, the AI apparatus 100 may control the external platform apparatus 300 by receiving the utterance sentence, converting the received utterance sentence into a language or a command supported by the external platform apparatus 300, and then transmitting the converted utterance sentence to the external platform apparatus 300.

For example, it may be assumed that the default platform (first platform) of the AI apparatus 100 according to the embodiment of the present invention is DeepThinkQ™, the default platform of the external platform apparatus 300 to be controlled is Alexa™, and Alexa™ supports only English. In this case, the AI apparatus 100 may control the external platform apparatus 300 by converting the utterance sentence of the language (e.g., Korean) other than English into English or a control command and transmitting the English utterance sentence or the control command to the external platform apparatus 300.

The learning device 200 may refer to a speech server that learns at least one of a speech-to-text (STT) engine for converting a user's utterance sentence into a text or a natural language processing engine for natural language processing.

The learning device 200 may learn at least one of the STT engine or the natural language processing engine using a machine learning algorithm or a deep learning algorithm.

The natural language processing engine may refer to an engine that generates at least one keyword corresponding to input speech data or text.

The learning device 200 may transmit the learned STT engine to the AI apparatus 100, and the AI apparatus 100 may convert an input utterance sentence in the form of a speech signal into a text using the learned STT engine.

The learning device 200 may transmit the learned natural language processing engine to the AI apparatus 100, and the AI apparatus 100 may obtain intention information about the utterance sentence converted into the text using the learned natural language processing engine.

The learning device 200 may receive the utterance sentence in the form of the speech signal from the AI apparatus 100, convert the received utterance sentence of the speech signal into a text using the learned STT engine, obtain the intention information about the utterance sentence converted into the text using the learned natural language processing engine, and transmit the obtained intention information to the AI apparatus 100.

The learning device 200 may receive the utterance sentence converted into the text from the AI apparatus 100, obtain intention information about the utterance sentence converted into the text using the learned natural language processing engine, and transmit the obtained intention information to the AI apparatus 100.

When the intention information about the utterance sentence is obtained, the AI apparatus 100 may generate response information corresponding to the intention information.

When the intention information about the utterance sentence is obtained, the learning device 200 may generate response information corresponding to the intention information and transmit the response information to the AI apparatus 100.

Here, the learning device 200 may receive the intention information about the utterance sentence from the AI apparatus 100 or directly generate the intention information using the learned natural language processing engine.

For example, when the utterance sentence asks the current weather, the learning device 200 or the AI apparatus 100 may obtains current weather information through the intention information about the utterance sentence, and generate the obtained current weather information as the response information.

Figure 4:
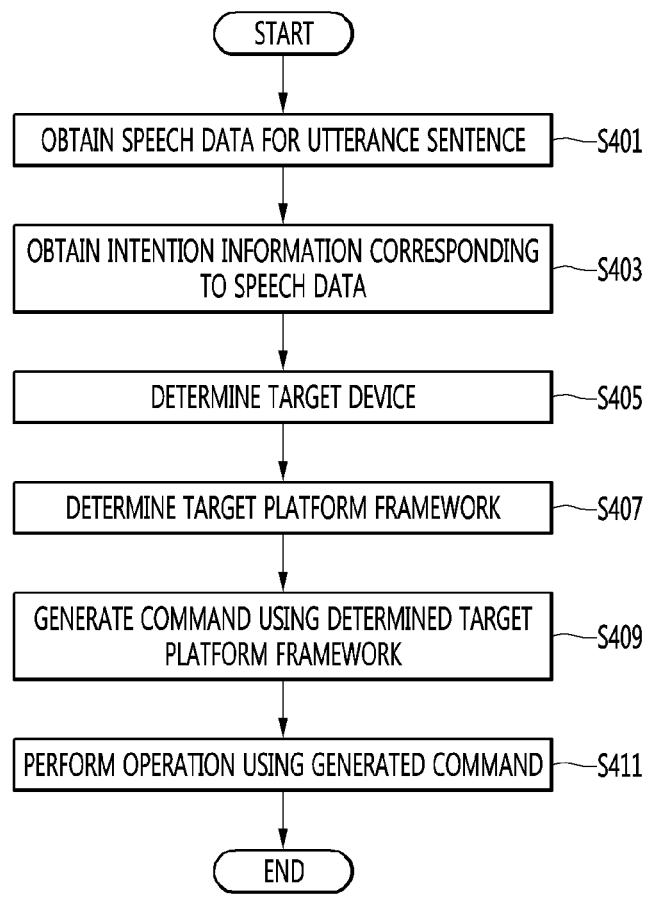
FIG. 4 is a flowchart illustrating a method for a speech interaction according to an embodiment of the present invention.

FIG. 4 is a flowchart illustrating a method for a speech interaction according to an embodiment of the present invention.

Referring to FIG. 4, the processor 180 of the AI apparatus 100 obtains speech data corresponding to a user's utterance sentence (S401).

The processor 180 may obtain speech data through the microphone 122 of the input unit 120.

The processor 180 may obtain speech data from the external terminal (not shown) through the wireless communication unit 110. In this case, the speech data may be obtained by the microphone (not shown) of the external terminal (not shown).

The utterance sentence may include a command for controlling the AI apparatus 100, the external platform apparatus 300, the IoT device 400a, 400b, or 400c, a query for searching for information, and the like.

The processor 180 may obtain speech data corresponding to the user's utterance sentence when a predetermined starting word is input.

The processor 180 of the AI apparatus 100 obtains intention information about the obtained speech data (S403).

The processor 180 may obtain speech data from which noise is removed by pre-processing so as to obtain intention information about the speech data.

Here, the processor 180 may generate speech data from which noise is removed by using a noise removing engine or a noise removing filter directly, or may transmit speech data to the learning device 200 and receive speech data from which noise is removed.

The volume of the speech data from which noise is removed through the pre-processing may be adjusted suitably for the AI apparatus 100. That is, the adjustment of the volume may be regarded as a part of the pre-processing.

Hereinafter, the speech data may mean speech data from which noise is removed through pre-processing.

The processor 180 may directly generate intention information about speech data.

Here, the processor 180 may generate intention information about speech data using at least one of an STT engine or a natural language processing engine received by the learning device 200.

The processor 180 may obtain intention information about speech data using the learning device 200.

Here, the processor 180 may convert the speech data into a text using the STT engine stored in the memory 170 and transmit the converted text to the learning device 200, and the learning device 200 may receive the intention information generated from the converted text using the natural language processing engine.

Here, the processor 180 may transmit the obtained speech data to the learning device 200, and the learning device 200 may receive the intention information generated using at least one of the STT engine or the natural language processing engine.

The generated intention information may include information such as the type of the utterance sentence, the target platform, the target device, and the contents of the speech.

The type of the utterance sentence may include control and query.

The target platform is an AI platform to perform control or query, and is not necessarily required. The case in which the information about the target platform is not included will be described later.

The target platform may be regarded as a kind of target device in a broad sense. That is, the target platform may refer to the external platform apparatus 300 using the corresponding platform, and the external platform apparatus 300 may be regarded as the target device.

The target device may refer to a device that is the target of the control when the utterance sentence is the control.

The target device may include at least one of the IoT device 400a, 400b, or 400c or the external platform apparatus 300 to be controlled.

That is, when the third type IoT device 400c is controlled through the external platform apparatus 300, the target device included in the intention information may include the external platform apparatus 300 and the third type IoT device 400c.

The speech contents may mean a keyword indicating the contents of the query when the utterance sentence is the query, and may mean a keyword indicating the contents of the control when the utterance sentence is the control.

For example, it is assumed that the AI apparatus 100 has a telephone function, and the user's utterance sentence is "Call John". In this case, the type of the utterance sentence included in the generated intention information may be "control", the target device may be the "current device", and the speech contents may be "call" or "John".

It is assumed that the AI apparatus 100 does not have a telephone function, but interworks with a smartphone having a telephone function, and the user's utterance sentence is "Call John". In this case, the type of the utterance sentence included in the generated intention information may be "control", the target device may be the "smartphone", and the speech contents may be "call" or "John".

The intention information described above is merely an example, and the intention information may be sufficient to include data that the AI apparatus 100 can determine what the intention of the user's utterance sentence is.

The processor 180 of the AI apparatus 100 determines the target device based on the generated intention information (S405), and determines the target platform framework based on the generated intention information (S407).

The processor 180 determines the target device to perform a control corresponding to the speech data, and generates a command for controlling the target device. In addition, the processor 180 may select the target platform framework to be used for generating the command from the first platform framework or the second platform framework.

As described above, the first platform framework refers to a platform framework used for the default platform of the AI apparatus 100, and the second platform framework refers to a platform framework different from the first platform.

The processor 180 may set the target device based on the intention information, and select the target platform framework according to the platform framework supported by the determined target device.

When the first platform framework is included in the platform framework supported by the determined target device, the processor 180 may select the first platform framework as the target platform framework in preference to the second platform framework.

The processor 180 may determine the target device using the connection table stored in the memory 170 and select the target platform framework.

The connection table may include information about the IoT device 400a, 400b, or 400c or the external platform apparatus 300 connected through the wireless communication unit 110.

The connection table will be described later with reference to FIGS. 5 and 6.

The processor 180 may use the connection table for the corresponding user by using user account information.

If there is no user account information, the user account information may be requested.

Therefore, the user may input the account information by logging in to the account at least once.

The processor 180 of the AI apparatus 100 generates a command corresponding to speech data using the determined target platform framework (S409).

The processor 180 may generate a command using intention information generated from speech data.

Generating the command using the target platform framework may mean generating a command including an application programming interface (API) supported by the target platform framework.

The processor 180 may generate a command according to a command format or grammar supported by the target platform framework.

The processor 180 of the AI apparatus 100 performs an operation corresponding to speech data using the generated command (S411).

The processor 180 may transmit the generated command to the target device to be controlled, so as to perform an operation corresponding to the command.

For example, it is assumed that the default platform (first platform) of the AI apparatus 100 is DeepThinkQ™, a light is the first type IoT device 400a, and the utterance sentence is "light on". In this case, among the intention information corresponding to the utterance sentence, the target device is "light" and the speech contents are "light on". Accordingly, the processor 180 may generate a command for turning on the light interworking with the first platform according to the grammar of the first platform framework for the first platform, and perform a control to turn on the light according to the generated command Here, the processor 180 may control the light by transmitting the generated command to the light.

If the target device includes the external platform apparatus 300 and the IoT device 400b or 400c interworking therewith, the processor 180 may perform an operation corresponding to the command by transmitting the generated command to the external platform apparatus 300. In this case, the external platform apparatus 300 may perform an operation corresponding to the command by transmitting the received command to the interworking IoT device 400b or 400c.

If the target device is only the AI apparatus 100 itself, the generated command may be directly processed.

For example, if the user's utterance sentence includes a command for controlling the operation of the AI apparatus 100, the AI apparatus 100 may perform an operation corresponding to the speech data by processing the generated command.

Although not shown in FIG. 4, the processor 180 may obtain a response according to the operation and provide the obtained response.

The processor 180 may output the response obtained through the display unit 151 as image information.

The processor 180 may convert the obtained response into speech by using a text-to-speech (TTS) engine and output the converted speech through the sound output module 152 or the speaker.

Accordingly, if using the AI apparatus 100 according to the embodiment of the present invention, it is possible to easily manage and control platform apparatuses or IoT devices using different AI platforms.

In addition, as the platform framework is additionally stored (mounted), compatibility with various AI platforms may be additionally secured.

In addition, the AI platform that is already in use can be implemented to operate in the same manner as the existing product by interworking through the user's account information.

In addition, from the user's point of view, products based on various AI platforms can be easily interacted with speech using only the AI apparatus 100 according to the embodiment of the present invention. Further, even if a plurality of AI platform apparatuses (AI agents) are provided, the plurality of AI agents can be used simply with the AI apparatus 100 according to the embodiment of the present invention. In addition, by using the AI apparatus 100 according to the embodiment of the present invention, the IoT device without the AI agent may interact with speech.

Also, from the manufacturer's point of view, even if any AI platform is mounted on the product, it is possible to connect with the AI apparatus 100 according to the embodiment of the present invention. Therefore, there is no difficulty in entering the AI platform ecosystem. If there is a controllable API in the IoT-connectable IoT device, the AI apparatus 100 according to the embodiment of the present invention may interact with speech. That is, separate design is not needed so that it can be controlled by speech. For example, if the product is designed using an IoTivity framework conforming to the OCF standard, the product may be easily compatible with the AI apparatus 100 according to the embodiment of the present invention.

Many manufacturers are now releasing AI speakers and agents on a variety of platforms. This requires the user to purchase multiple platforms as needed, and there is a problem in that one platform cannot control products of another AI platform. However, since the AI apparatus 100 according to the embodiment of the present invention operates as one master platform, all the products of other AI platforms can be controlled. Therefore, it is also economically profitable for the user and ensures ease of use.

FIG. 5 is a view illustrating an example of a connection table according to an embodiment of the present invention.

Figure 6:
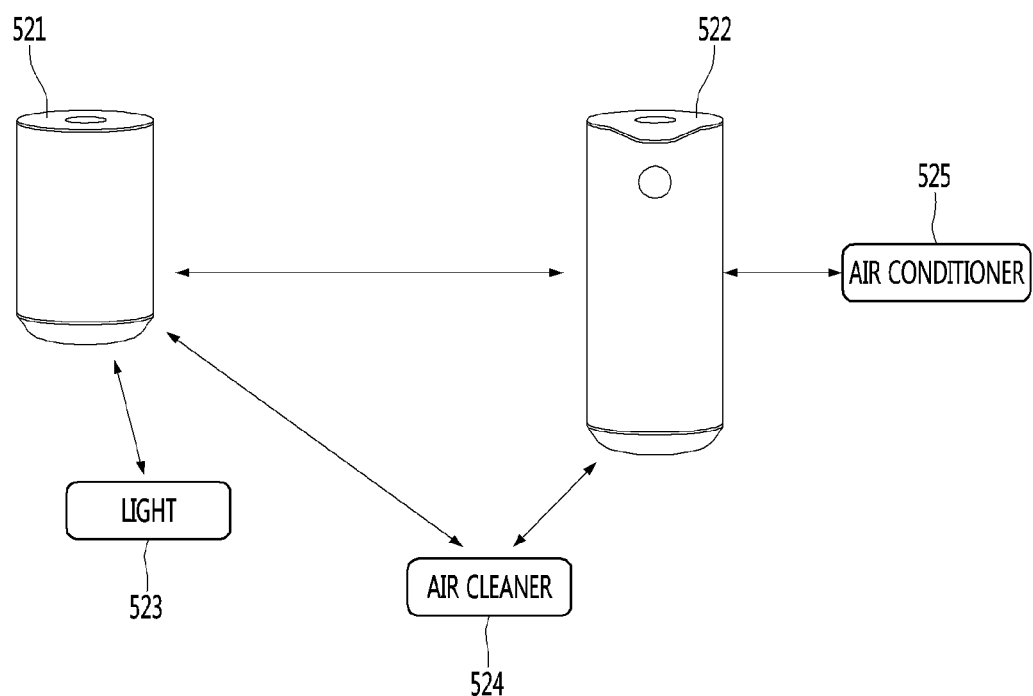
FIG. 6 is a view illustrating an artificial intelligence system 601 corresponding to the connection table of FIG. 5.

FIG. 6 is a view illustrating an artificial intelligence system 601 corresponding to the connection table of FIG. 5.

Referring to FIG. 5, the connection table 501 stored in the memory 170 may include information about the IoT device 400*a*, 400*b*, or 400*c* or the external platform apparatus 300 connected through the wireless communication unit 110.

The connection table 501 may include at least one of a device name 511, device identification information 512, a device type 513, a type of supported platform framework 514, or connection relationship information 515 for each device.

In the device name 511, a device name previously set to a device may be set as a default value.

The device name 511 may be modified by the user's setting. For example, a nickname may be stored when the user sets a nickname.

Alternatively, when the user sets the nickname, the nickname set to the device nickname (not shown) item of the connection table 501 may be stored.

The device identification information 512 is unique information for identifying apparatuses (devices) managed by the connection table 501. The device identification information 512 may be set to a serial number unique to each apparatus (device), and may be set in a format such as "device type-number" in consideration of the order stored in the connection table 501.

For example, the device identification information 512 of the first IoT device registered in the connection table 501 may be set to IoT-1. Similarly, the identification information 512 of the first external platform apparatus (or external platform hub) registered in the connection table 501 may be set to Hub-1.

In particular, the connection table 501 may include information about the AI apparatus 100. In this case, since the item for the AI apparatus 100 in the connection table 501 indicates itself, the identification information 512 may be set to Hub-0.

Referring to FIGS. 5 and 6, the AI system 601 illustrated in FIG. 6 includes a total of five devices 521 to 525, and information about the five devices 521 to 525 is registered and managed in the connection table 501 illustrated in FIG. 5.

The first device (device 1, 521) is the AI apparatus 100 itself.

Here, the information about the first device 521 stored in the connection table 501 indicates that the name 511 may be DeepThinkQ™, the identification information 512 may be Hub-0, the device type 513 may be the platform hub, the platform framework 514 may be DeepThinkQ™, and the connection 515 may be itself.

The second device (device 2, 522) is the external platform apparatus (or external platform hub, 300). The second device 522 is connected to the first device 521.

Here, the information about the second device 522 stored in the connection table 501 indicates that the name 511 may be Alexa™, the identification information 512 may be Hub-1, the device type 513 may be the platform hub, the platform framework 514 may be Alexa™, and the connection relationship 515 may be Hub-0.

The third device (device 3, 523) is the first type IoT device 400*a*. The third device 523 is connected to the first device 521.

Here, the information about the third device 523 stored in the connection table 501 indicates that the name 511 may be the light, the identification information 512 may be IoT-1, the device type 513 may be the IoT device, the platform framework 514 may be DeepThinkQ™, and the connection relationship 515 may be Hub-0.

The fourth device (device 4, 524) is the second type IoT device 400*b*. The fourth device 524 is connected to the first device 521 and the second device 522.

Here, the information about the fourth device 524 stored in the connection table 501 indicates that the name 511 may be the air cleaner, the identification information 512 may be IoT-2, the device type 513 may be the IoT device, the platform framework 514 may be Alexa™, and the connection relationship 515 may be Hub-0 and Hub-1.

The fifth device (device 5, 525) is the third type IoT device 400*c*. The fifth device 523 is connected to the second device 522.

Here, the information about the fifth device 525 stored in the connection table 501 indicates that the name 511 may be the air conditioner, the identification information 512 may be IoT-3, the device type 513 may be the IoT device, the platform framework 514 may be Alexa™, and the connection relationship 515 may be Hub-1.

For example, even if the speech data specifies only the fifth device 525, the processor 180 may determine that the fifth device 525 should be controlled through the second device Hub-1 522 according to the connection relationship 515 stored in the connection table 501.

DeepThinkQ™ and Alex™ are merely an example of the platform, and various AI platforms may be used depending on the actual implementation.

The connection table 501 may be generated and managed separately for each user. That is, a different connection table may be used for each user.

Figure 7:
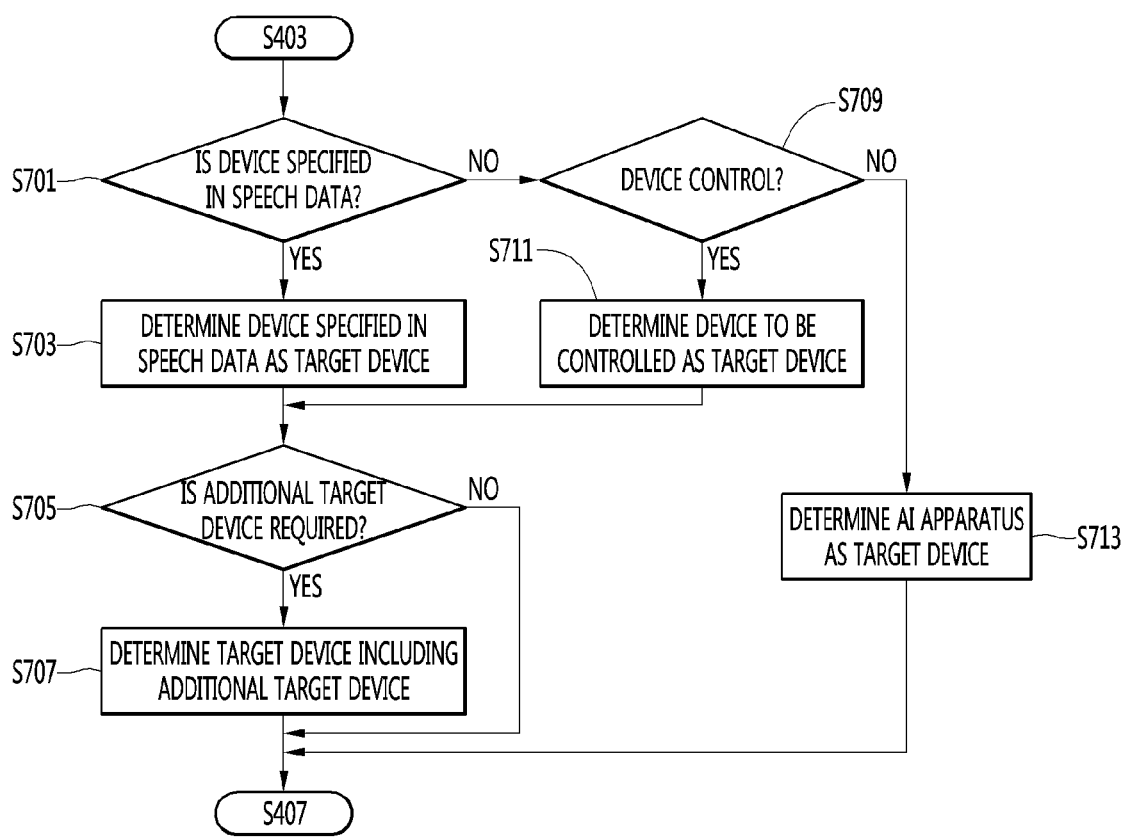
FIG. 7 is a flowchart illustrating an example of a step S405 of determining a target device illustrated in FIG. 4.

FIG. 7 is a flowchart illustrating an example of a step S405 of determining a target device illustrated in FIG. 4.

Referring to FIG. 7, the processor 180 determines whether the device is specified in speech data (S701).

Whether the device is specified in the speech data may mean whether information about the target device is included in the obtained intention information.

If it is determined in step S701 that the device is specified in the speech data, the processor 180 determines the device specified in the speech data as the target device (S703).

As described above, the target device may include at least one of the AI apparatus 100, the external platform apparatus 300, or the IoT device 400*a*, 400*b*, or 400*c* according to the embodiment of the present invention.

For example, if the default platform of the AI apparatus 100 is DeepThinkQ™ and the user's utterance sentence is "Tell DeepThinkQ™ to turn off", the device specified in the speech data may be regarded as the AI apparatus 100.

The processor 180 determines whether an additional target device is required (S705).

The processor 180 may determine whether an additional target device is required, based on whether the device corresponding to the intention information can be performed using only the device specified in the speech data.

For example, it is assumed that the speech data specifies the third type IoT device 400*c* and includes contents for controlling the third type IoT device 400*c*. In this case, since the third type IoT device 400*c* is a device that the AI apparatus 100 cannot interwork and control alone, the processor 180 may determine that an additional target device is required by determining that information about the external platform apparatus 300 that can interwork with the third type IoT device 400*c* is required.

The target device includes at least one of the external platform apparatus 300 or the IoT device 400*a*, 400*b*, or 400*c*, and the second type IoT device 400*b* or the third type IoT device 400*c* may be included in the target device together with the external platform apparatus 300. In particular, the third type IoT device 400*c* may be included in the target device together with the external platform apparatus 300 that can be interworked.

According to the embodiment, only the external platform apparatus 300 interworking with the third type IoT device 400*c* may be specified in the speech data for controlling the third type IoT device 400*c*.

Since the external platform apparatus 300 interworking with the third type IoT device 400*c* stores registration information or interworking information about the interworking third type IoT device 400*c*, the external platform apparatus 300 can control the third type IoT device 400*c* in such a manner that the processor 180 of the AI apparatus 100 simply transmit the command for controlling the third type IoT device 400*c* to the external platform.

Therefore, in this case, the processor 180 may perform an operation corresponding to speech data even if only the external platform apparatus 300 is determined as the target device.

Therefore, in one embodiment, determining whether the additional target device is required may mean determining whether the device specified in the speech data is the third type IoT device 400*c*.

If it is determined in step S705 that the additional target device is required, the processor 180 determines the target device including the additional target device (S707).

For example, it is assumed that the speech data includes contents for controlling the third type IoT device 400*c*, and the speech data specifies only the third type IoT device 400*c*. In this case, the processor 180 may determine the external platform apparatus 300 interworking with the third type IoT device 400*c* as the additional target device, and may include the external platform apparatus 300 in the target device. That is, in this example, the target device is the external platform apparatus 300 and the third type IoT device 400*c*.

If it is determined in step Step S705 that no additional target device is required, the process proceeds to step Step S407 of determining the target platform framework shown in FIG. 4.

If it is determined in step S701 that the device is not specified in the speech data, the processor 180 determines whether the intention information corresponding to the speech data includes information for controlling the device (S709).

For example, if the user's utterance sentence is "light on", no device is specified in the speech data. However, the processor 180 may confirm that the intention information includes device control information of "light on".

If it is determined in step S709 that the intention information includes the information for controlling the device, the processor 180 determines that the device to be controlled is the target device (S711). Then, the process proceeds to step S705 described above.

For example, when the user's utterance sentence is "light on", the processor 180 may determine the light to be turned on as the target device. The process proceeds to step S705 to determine whether the additional target device is required. If required, the target device may be determined while including the additional target device.

If it is determined in step S709 that the intention information does not include the information for controlling the device, the processor 180 determines the AI apparatus 100 as the target device (S713). The process proceeds to step S407 of determining the target platform framework shown in FIG. 4.

If the intention information does not include information for controlling the device, it may mean that the user's utterance sentence does not control the device but simply queries.

For example, when the user's utterance sentence is "what is the weather now", the processor 180 may determine the target device as the AI apparatus 100.

Figure 8:
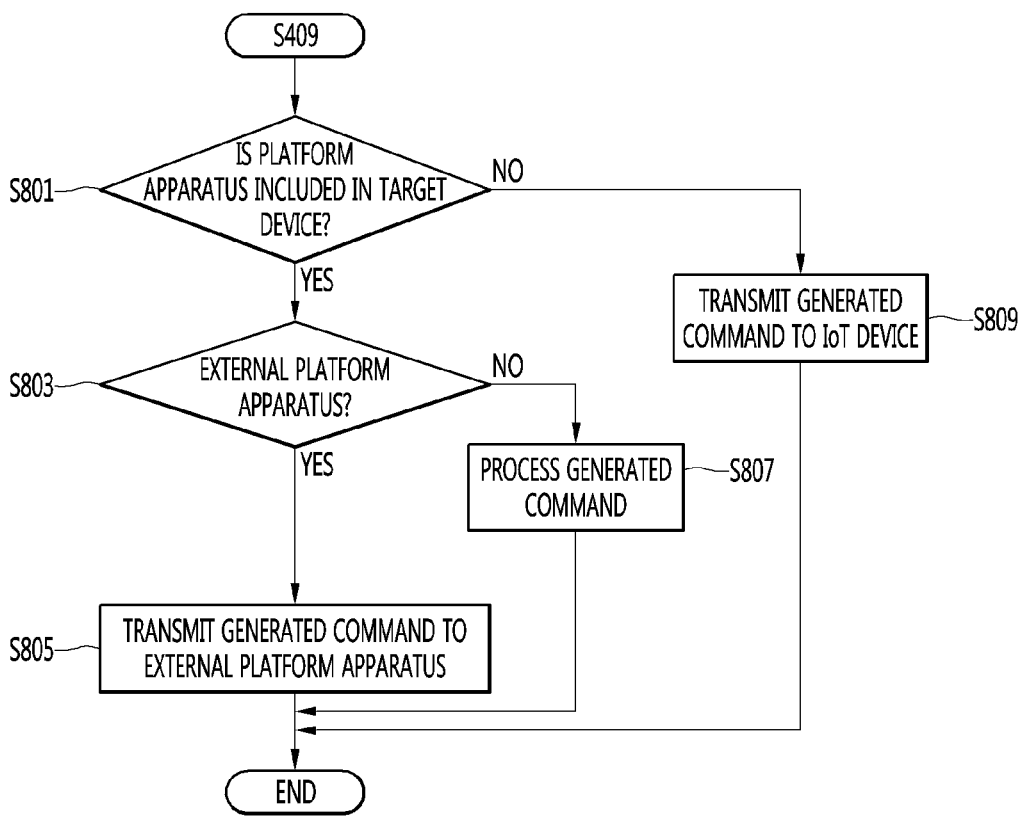
FIG. 8 is a flowchart illustrating an example of a step S411 of performing an operation using a generated command illustrated in FIG. 4.

FIG. 8 is a flowchart illustrating an example of a step S411 of performing an operation using a generated command illustrated in FIG. 4.

Referring to FIG. 8, the processor 180 determines whether the platform apparatus is included in the target device (S801).

The platform apparatus refers to the AI apparatus 100 or the external platform apparatus 300 according to the embodiment of the present invention.

If it is determined in step S801 that the target device includes the platform apparatus, the processor 180 determines whether the platform apparatus included in the target device is the external platform apparatus 300 (S803).

If it is determined in step S803 that the platform apparatus included in the target device is the external platform apparatus, the processor 180 transmits the generated command to the external platform apparatus 300 (S805).

If it is determined in step S803 that the platform apparatus included in the target device is not the external platform apparatus, the processor 180 processes the generated command (S807).

The fact that the platform apparatus included in the target device is not the external platform apparatus means that the platform apparatus included in the target device is the AI apparatus 100 itself.

Therefore, the processor 180 processes the generated command because the processor is the processing subject of the generated command.

Processing the generated command may mean executing the generated command.

The execution of the generated command includes executing the command for controlling the interworking IoT device 400*a* or 400*b*. Thus, in a broad sense, the execution of the generated command may include transmitting the control signal corresponding to the generated command to the interworking IoT device 400*a* or 400*b*.

That is, if the generated command is the command for controlling the IoT device 400*a* or 400*b* directly interworking with the AI apparatus 100, the processor 180 may process the generated command by transmitting the generated command or the control signal corresponding to the command to the IoT device 400a or 400b as the target device.

If the generated command is the command for requesting the response to the query, the processor 180 may obtain information about the query using the memory 170, the learning device 200, or the Internet, and provide the response based on the obtained information.

If it is determined in step S801 that the platform apparatus is not included in the target device, the processor 180 transmits the generated command to the IoT devices 400a and 400b included in the target device (S809).

As described with reference to FIG. 7, the target device determined for the speech data controlling the third type IoT device 400c includes not only the third type IoT device 400c but also the external platform apparatus 300 interworking therewith. Therefore, when the command for controlling the third type IoT device 400c is processed, the process is not processed by step S809 because the platform apparatus is included in the target device.

Meanwhile, since the first type IoT device 400a or the second type IoT device 400b can directly interwork with the AI apparatus 100, the platform apparatus may not be included in the target device. Therefore, the process may be processed by step S809 when the command for controlling the first type IoT device 400a and the second type IoT device 400b is processed.

Figure 9:
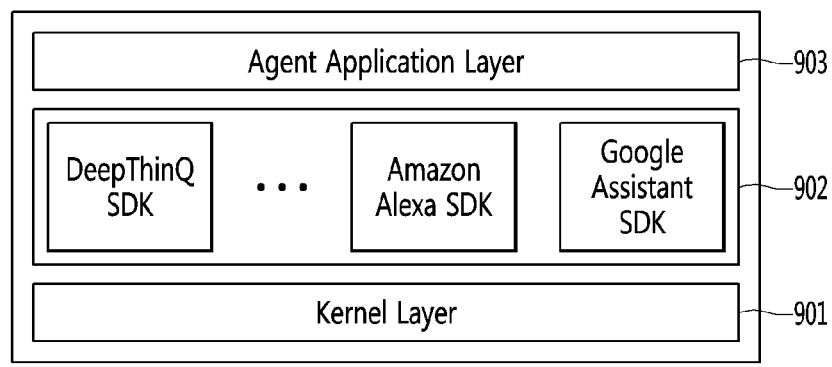
FIG. 9 is a view illustrating a software structure of an artificial intelligence apparatus 100 according to an embodiment of the present invention.

FIG. 9 is a view illustrating a software structure of an artificial intelligence apparatus 100 according to an embodiment of the present invention.

Referring to FIG. 9, the software of the AI apparatus 100 may include a kernel layer 901, a platform framework layer 902, and an agent application layer 903.

The platform framework layer 902 may include a first platform framework for a default platform of the AI apparatus 100 and at least one second platform framework.

Each platform framework may be configured with an SDK for each platform.

The agent application layer 903 includes an application running on the AI apparatus 100, and may use platform frameworks included in the platform framework layer 902.

FIG. 10 is a view illustrating an example of a command format 1001 of a platform framework according to an embodiment of the present invention.

Referring to FIG. 10, the command format 1001 of the platform framework may be a format including a platform name, a language of a command, an input type, and the like.

The language of the command refers to a language supported by the platform framework and may include, for example, English and Korean.

The input type refers to the type of data input as the command and may include text, speech, and the like.

That is, FIG. 10 illustrates a command format in which the language supporting the platform called Alexa™ is English and the input should have a text format.

If the platform of the AI apparatus 100 is DeepThinkQ™ and the target platform (target platform framework) is Alexa™, the command generated from the speech data by the AI apparatus 100 may be configured as API command generated using the target platform framework, or may be configured as a command in which speech data is converted into English text according to the command format shown in FIG. 10.

For example, if the contents of the speech data are "turn on the light", the AI apparatus 100 may generate the text "Turn on the light" as the command according to the command format shown in FIG. 10, and may generate API command such as "Control (Light, On) as API supported by the target platform framework.

Converting the speech data into the text may be preceded in order to obtain intention information corresponding to the speech data. Therefore, if the command format of the target platform is the text, the AI apparatus 100 may need not the operation of converting a separate speech into text.

If the language supported by the target platform is different from the language supported by the AI apparatus 100, and the target platform allows only speech as the input type, the AI apparatus 100 may convert the speech data converted into the text into the text of the language supported by the target platform, and convert the converted text into speech.

FIG. 11 is a view illustrating an example of user information 1101 according to an embodiment of the present invention.

Referring to FIG. 11, the user information 1101 may include user identification information, language, target platform, product information, and the like.

In the example of FIG. 11, the language used by the user whose user identification information is "user001" is Korean. It is assumed that if the AI apparatus 100 controls the external platform apparatus 300 or controls the IoT device 400b or 400c through the external platform apparatus 300, the external platform apparatus 300 supports only English.

In this case, the AI apparatus 100 may control the external platform apparatus 300 or the IoT device 400b or 400c and receive a response thereof. Since the response is received from the external platform apparatus 300, the response is obtained in English.

Since the language used by the user is Korean, the AI apparatus 100 may translate the obtained response from English to Korean, and convert the text translated in Korean into speech.

FIG. 12 is a view illustrating an example of a response 1201 for a speech interaction according to an embodiment of the present invention.

Referring to FIG. 12, the response 1201 to the speech interaction may include a target platform (TargetPlatform), interaction success or failure (Final), a simplified interaction result (Result), a detailed interaction result (ResultDetails), and the like.

The response 1201 in the example of FIG. 12 includes information indicating that the target platform is Alexa™, the interaction has been successful, and the air cleaner is operated as the result of the interaction, and specifically, the air cleaner has an air volume of 3 and operates in a rotation mode.

The processor 180 of the AI apparatus 100 may reconfigure the response such as "Yes, operating the air cleaner through Alexa™. As the processing result, the air cleaner operates in an air volume 3 in a rotation mode", based on the obtained response 1201. The processor 180 may convert the reconfigured response into speech and output the speech.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence apparatus for a speech interaction, comprising:
a microphone configured to obtain speech data corresponding to an utterance sentence of a user;
a memory configured to store a first platform framework corresponding to a default platform of the artificial intelligence apparatus and at least one second platform framework;
a communication unit configured to communicate with at least one of an Internet of Things (IoT) device or an external platform apparatus, wherein the IoT device is classified into one of a first type IoT device using the first platform framework and capable of directly communicating with the artificial intelligence apparatus, a second type IoT device using the at least one second platform framework and capable of directly communicating with the artificial intelligence apparatus, or a third type IoT device capable of communicating through the external platform apparatus; and
a processor configured to:
obtain intention information corresponding to the speech data,
determine at least one target device among the artificial intelligence apparatus, the IoT device, or the external platform apparatus based on the intention information,
determine a target platform framework among the first platform framework or the at least one second platform framework based on the intention information, wherein the determined target platform framework is selected according to a platform framework supported by the determined target device,
generate a command corresponding to the speech data using the determined target platform framework, and
perform an operation corresponding to the speech data for the target device using the generated command.

2. The artificial intelligence apparatus according to claim 1, wherein the processor is configured to perform the operation corresponding to the speech data by executing the generated command, if the determined target device is the artificial intelligence apparatus, and transmit the generated command to the determined target device, if the determined target device is the IoT device or the external platform apparatus.

3. The artificial intelligence apparatus according to claim 1, wherein the processor is configured to transmit the command to the external platform apparatus if the target device includes the external platform apparatus.

4. The artificial intelligence apparatus according to claim 1, wherein, if the intention information is a command for controlling the first type IoT device or the second type IoT device, the processor is configured to perform the operation corresponding to the speech data by directly transmitting the generated command to the first type IoT device or the second type IoT device.

5. The artificial intelligence apparatus according to claim 1, wherein if the intention information is a command for controlling the third type IoT device and the target device includes only the third type IoT device, the processor is configured to perform the operation corresponding to the speech data by identifying an external platform apparatus connected to the third type IoT device and transmitting the generated command to the identified external platform apparatus.

6. The artificial intelligence apparatus according to claim 1, wherein the memory is configured to store a connection table including information about the IoT device or the external platform apparatus, connected to the communication unit, and
wherein the processor is configured to determine the target device and the target platform framework using the connection table.

7. The artificial intelligence apparatus according to claim 6, wherein the connection table includes at least one of a device name, device identification information, a type of a supported platform framework, or connection relationship information.

8. The artificial intelligence apparatus according to claim 1, wherein if the platform framework supported by the determined target device includes the first platform framework, the processor is configured to determine the first platform framework as the target platform framework preferentially.

9. The artificial intelligence apparatus according to claim 1, further comprising a speaker,
wherein the processor is configured to:
obtain a response corresponding to a control,
convert the obtained response into a speech, and
output the converted speech through the speaker.

10. The artificial intelligence apparatus according to claim 1, wherein the processor is configured to:
convert the speech data into a text using a speech to text (STT) engine, and
obtain the intention information from the converted text using a natural language processing engine, and
wherein at least one of the STT engine or the natural language processing engine is learned by using a machine learning algorithm or a deep learning algorithm.

11. A method for a speech interaction using an artificial intelligence apparatus, comprising:
obtaining speech data corresponding to an utterance sentence of a user;
obtaining intention information corresponding to the speech data;
determining at least one target device among the artificial intelligence apparatus, an Internet of Things (IoT) device, or an external platform apparatus based on the intention information, wherein the IoT device is classified into one of a first type IoT device using a first platform framework and capable of directly communicating with the artificial intelligence apparatus, a second type IoT device using a second platform framework and capable of directly communicating with the artificial intelligence apparatus, or a third type IoT device capable of communicating through the external platform apparatus;
determining a target platform framework among a first platform framework corresponding to a default platform of the artificial intelligence apparatus or another at least one second platform framework based on the intention information, wherein the determined target platform framework is selected according to a platform framework supported by the determined target device;
generating a command corresponding to the speech data using the determined target platform framework; and
performing an operation corresponding to the speech data for the target device using the generated command.

12. A non-transitory recording medium having recorded thereon a program for performing a method for a speech interaction, the method comprising:
obtaining speech data corresponding to an utterance sentence of a user;

obtaining intention information corresponding to the speech data;

determining at least one target device among an artificial intelligence apparatus, an Internet of Things (IoT) device, or an external platform apparatus based on the intention information, wherein the IoT device is classified into one of a first type IoT device using a first platform framework and capable of directly communicating with the artificial intelligence apparatus, a second type IoT device using a second platform framework and capable of directly communicating with the artificial intelligence apparatus, or a third type IoT device capable of communicating through the external platform apparatus;

determining a target platform framework among a first platform framework corresponding to a default platform of the artificial intelligence apparatus or another at least one second platform framework based on the intention information, wherein the determined target platform framework is selected according to a platform framework supported by the determined target device;

generating a command corresponding to the speech data using the determined target platform framework; and performing an operation corresponding to the speech data for the target device using the generated command.

* * * * *